United States Patent
Ye et al.

(10) Patent No.: US 7,242,714 B2
(45) Date of Patent: Jul. 10, 2007

(54) CYCLIC RESYNCHRONIZATION MARKER FOR ERROR TOLERATE VIDEO CODING

(75) Inventors: Jong Chul Ye, Croton-on-Hudson, NY (US); Yingwei Chen, Briarcliff Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 763 days.

(21) Appl. No.: 10/284,218

(22) Filed: Oct. 30, 2002

(65) Prior Publication Data

US 2004/0086050 A1    May 6, 2004

(51) Int. Cl.
*H04N 1/66* (2006.01)
*G06K 9/36* (2006.01)

(52) U.S. Cl. .................. 375/240.08; 382/236
(58) Field of Classification Search ........... 375/240.28, 375/240.27, 240.08, 240.18, 240.2, 240.16; 382/239, 236, 243, 238; 348/402.1
See application file for complete search history.

(56) References Cited

U.S. PATENT DOCUMENTS

| | | | | |
|---|---|---|---|---|
| 6,539,121 B1 * | 3/2003 | Haskell et al. | .............. | 382/239 |
| 6,728,318 B2 * | 4/2004 | Lin et al. | ................ | 375/240.27 |
| 6,778,610 B2 * | 8/2004 | Lin | ....................... | 375/240.27 |
| 6,816,194 B2 * | 11/2004 | Zhang et al. | .......... | 375/240.27 |
| 6,959,046 B2 * | 10/2005 | Dufour et al. | ......... | 375/240.28 |

FOREIGN PATENT DOCUMENTS

JP            200036760           2/2000

* cited by examiner

*Primary Examiner*—Gims Philippe

(57) ABSTRACT

A system and method are disclosed that provide an advanced design of coded video packets using a resynchronization maker for video transmission applications. The resynchronization marker has a fixed ranged bit length within each video object plane or video frame and is cyclically updated video frame by video frame. This coded video packet structure allows decoders to automatically find the video object plane boundary without additional bit stream overhead. This has a particular advantage when a video object plane header is lost during transmission.

19 Claims, 5 Drawing Sheets

CYCLIC RESYNCHRONIZATION MARKER FOR ERROR TOLERATE VIDEO CODING

BACKGROUND OF THE INVENTION

1. Field of the Invention

The present invention is related to video coding systems, in particular, the present invention relates to an advanced data partition scheme using an improved cyclic resynchronization marker that enables error tolerate video decoding. The invention has particular utility in connection with variable-bandwidth networks and computer systems that are able to accommodate different bit rates, and hence different quality images.

2. Description of the Related Art

Scalable video coding in general refers to coding techniques that are able to provide different levels, or amounts, of data per frame of video. Currently, such techniques are used by video coding standards, such as MPEG-1 MPEG-2 and MPEG-4 (i.e., Motion Picture Experts Group), in order to provide flexibility when outputting coded video data. While MPEG-1 and MPEG-2 video compression techniques are restricted to rectangular pictures from natural video, the scope of MPEG-4 visual is much wider. MPEG-4 visual allows both natural and synthetic video to be coded and provides content based access to individual objects in a scene.

A typical video packet structure in MPEG-4 error resilient mode is shown in FIG. 1. It is noted that the video packet (VP) contains information of several macroblocks, and a selectable packet size determines the number of macroblocks to be included in a single packet. As shown in FIG. 1, the MPEG-4 video packet structure includes a RESYNC marker, a quantization paramerter (QP), a header extension code (HEC), a macroblock (MB) number, motion and header information, a motion marker (MM) and texture information. The MB number provides the necessary spatial resynchronization while the quantization parameter allows the differential decoding process to be resynchronized.

The motion and header information field includes information of motion vectors (MV) DCT DC coefficients, and other header information such a macroblock types. The remaining DCT AC coefficients are coded in the texture information field. The motion marker separates the DC and AC DCT coefficients.

The MPEG-4 video standard provides error robustness and resilience to allow accessing image or video information over a wide range of storage and transmission media. The error resilience tools developed for the MPEG-4 video standard can be divided into three major areas: resynchronization, data recovery, and error concealment.

The resynchronization tools attempt to enable resynchronization between a decoder and a bitstream after a residual error or errors have been detected. Generally, the data between the synchronization point prior to the error and the first point where synchronization is reestablished, is discarded. If the resynchronization approach is effective at localizing the amount of data discarded by the decoder, then the ability of other types of tools that recover data and/or conceal the effects of errors is greatly enhanced.

The current video packet approach used by MPEG-4 is based on providing periodic resynchronization markers throughout the bitstream. These resynchronization markers are designed such that they can be easily distinguished from all other codewords and small perturbation of these codewords. Header information (regarding the spatial and temporal locations or other in-picture predictive information concerning the subsequent bits) is attached immediately after the resynchronization information. This way, the decoder can resume proper decoding upon the detection of a resynchronization marker. However, it is noted that insertion of the resynchronization markers reduce the coding efficiency. That is, the longer and more frequent are such markers, the more bits will be used for them, which increases the coding overhead. But longer and frequently inserted markers enable the decoder to regain synchronization more quickly, so that a transmission error affects a smaller region in the reconstructed frame.

As discussed above, in MPEG-4, the resynchronization (RESYNC) marker is used to distinguish the start of a new video packet. This marker is distinguishable from all possible VLC codewords as well as the VOP start code. In the MPEG-4 video packet structure, the RESYNC marker is defined as binary number having 16-22 zeros ("0") followed by a one ("1"). It is noted that header information is also provided at the start of a video packet. Contained in this header information is the data necessary to restart the decoding process.

After synchronization has been reestablished, data recovery tools attempt to recover data that in general would be lost. These tools are not simply error correcting codes, but instead techniques that encode the data in an error resilient manner. For example, one particular tool is Reversible Variable Length Codes (RVLC). In this approach, the variable length codewords are designed such that they can be read both in the forward as well as the reverse direction.

However, there exists a need for a video coding technique that incorporates improved data partitioning for more error tolerate decoding.

SUMMARY OF THE INVENTION

The present invention addresses the foregoing need by providing a resynchronization marker for a coded video packet that facilitates error tolerate video coding and decoding.

One aspect of the present invention is directed to a system and method that provide an advanced design of coded video packets using a resynchronization maker for video transmission applications. The resynchronization marker has a fixed ranged bit length within each video object plane or video frame and is cyclically updated video frame by video frame. This coded video packet structure allows decoders to automatically find the video object plane boundary without additional bit stream overhead. This has a particular advantage when a video object plane header is lost during transmission.

Another aspect of the present invention, a coded video packet structure is provided. The coded video packet structure includes a resynchronization marker that indicates a start of the coded video packet structure, predicted coding information; and motion/texture information that includes DC DCT coefficients and AC DCT coefficients. The resynchronization marker can be represented by a binary number having a calculated number of zeros followed by a one. The number of zeros is determined by a formula that ensures that the resynchronization marker has a unique value as compared to the resynchronization markers of other coded video packets.

One embodiment of the present invention is directed a method of encoding video data. The method includes the steps of receiving input video data, encoding the input video data in accordance with a predetermined coding process and formatting the encoded input video data into a video packet.

The coded video packet includes a start marker, at least one subsection including predicted coding information, and an encoded data section. The start marker can be represented by a binary number having a calculated number of zeros followed by a one. The number of zeros is determined by adding a constant value to a value determined during the encoding step modulo divided by a predetermined number.

Another embodiment of the present invention is directed to an apparatus for decoding a plurality of encoded video packets forming two or more video object planes. The apparatus includes a memory which stores computer-executable process steps and a processor which executes the process steps stored in the memory so as (i) to receive the plurality of encoded video packets, (ii) to search for a start marker in each of the plurality of encoded video packets, and (iii) to determine based upon the start marker a boundary between two of the video object planes.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

Referring again to FIG. 1 in the MPEG-4 video packet structure, the RESYNC marker is defined as binary number having 16-22 zeros ("0") followed by a one ("1"). The length of the zero-run is determined by a VOP type (e.g., I, P, B-VOP) and motion vector f_code information. The exact details of generating the conventional MPEG-4 RESYNC marker are not necessary for the understanding of the present invention and are therefore not described in detail herein.

Figure 1:
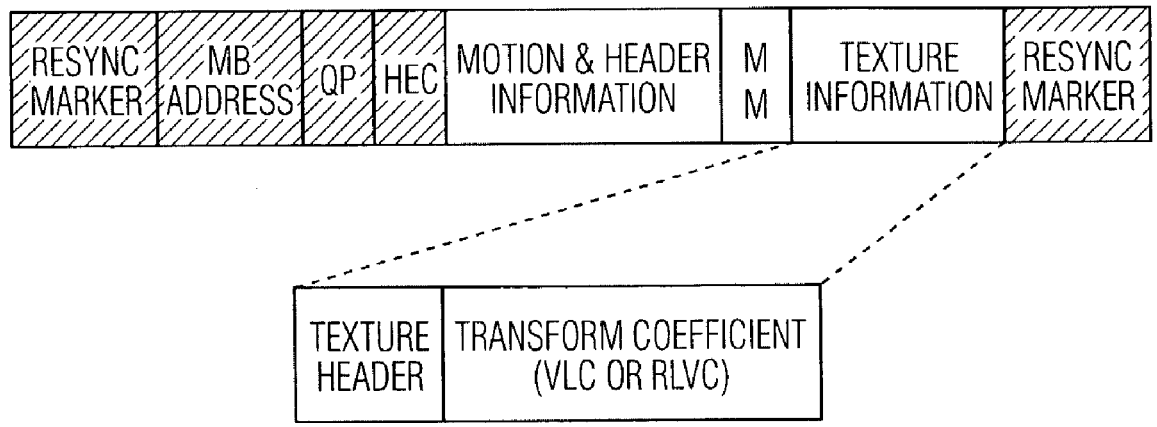
FIG. 1 depicts a conventional MPEG-4 video packet structures.

Using the MPEG-4 data partitioning VP structure of FIG. 1, all the required predicted coding information such as quantizer scale, AC/DC prediction and motion vector coding are restricted within each video packet. Thus, if a VP is lost, the packet loss does not propagate to subsequent video packets. Therefore, the VP structure is an independent coding unit to allow for robust video transmission over lossy channels.

Figure 2:
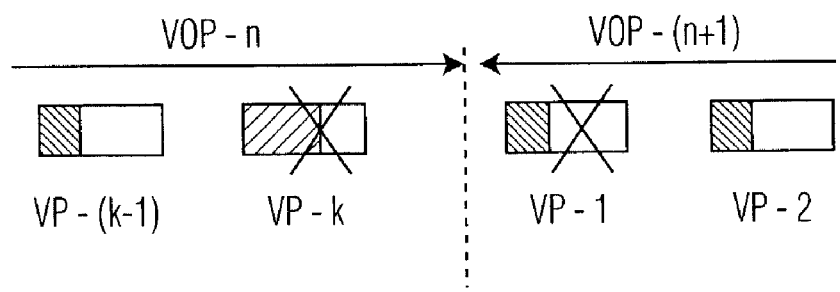
FIG. 2 depicts a video packet erasure scenario.

However, one significant shortcoming of the RESYNC marker and the VD structure of FIG. 1 will be described in connection with FIG. 2. In FIG. 2, the last two video packets (VP-(k−1) and VP-k) are shown from an nth Video Object Plane (VOP-n) and the first two video packets (VP-1 and VP-2) are shown from the nth+1 Video Object Plane (VOP-(n+1)). A possible video packet erasure problem is shown wherein the last video packet (VP-k) of VOP-n and the first video packet (VP-1) of VOP-(n+1) have been lost. In this example, it is assumed that the RESYNC markers lengths for VOP-n and VOP-(n+1) are identical, which often happens using the MPEG-4 standard. In this situation, in order to determine which VOP the second video packet (VP-2) is from, a decoder receiving these video packets needs to check the macroblock (MB) number field (see, e.g., FIG. 1).

More specifically, if the MB from VP-2 of VOP-(n+1) is smaller than the expected MP numbers after VP-(k−1) of VOP-n, then the decoder can determine that VP-2 belongs to VOP-(n+1). This is because the MB field of a VP indicates the starting marcroblock numbers, hence the MB field values for consecutive VP within frame should increase. However, if the MB number of VP-2 of VOP-(n+1) is larger than the expected MB numbers, the decoder cannot determine which VOP VP-2 should belong to which will cause the decoder to lose synchronization.

In order to overcome this shortcoming of the conventional MPEG-4 VP structure, one possibility is to provide additional VOP number fields for each video packet. However, this approach incurs coding overhead and requires look-ahead operations. This would degrade performance of the video system and is not desirable.

The present invention overcomes the above noted shortcomings without using additional VOP number fields and look-ahead operations by changing the length of the RESYHNC marker cyclically.

In one embodiment of the present invention, the length of the zero run for a VOP RESYNC marker is determined using the following formula:

$$\text{Length\_zero\_run} = 16 + (VOP\_seq\_num \% 7) \text{ bits}$$

In the above formula, "%" denotes the modulo division operation and VOP_seq_num is the VOP sequence number which is automatically computed as MPEG-4 decoding progresses in both an encoder and a decoder. Using this formula, every VOP in a group of seven consecutive VOPs has a unique RESYNC marker. In MPEG-4 standard, the length of zero run for the RESYNC marker is set between 16-22 bits, hence the above mentioned formula guarantees that the resultant length of the RESYNC marker is between 16-23 bits and also guarantees the maximum separation between VOPs. However, if the length restriction for the RESYNC marker size is not imposed, different constant values for the above formula can be allowed.

Returning to FIG. 2, using the above formula to determine the RESYNC markers for VOP-n and VOP-(n+1), will overcome the shortcoming discussed above. The RESYNC markers for VP-(k−1) of VOP-n and VP-2 of VOP-(n+1) will be different. When the decoder detects a different RESYNC marker, it can automatically determine that the VP is from a different VOP. Also, if the decoder cannot read the RESYNC marker of VP-2 of VOP-(n+1), an error message, i.e., an unexpected symbol, can be generated because the decoder is expecting the arrival of the RESYNC marker Using this error message, the decoder can automatically know the boundary of the two VOPs.

In another embodiment, the RESYNC marker zero run may be determined as follows:

$$\text{Length\_zero\_run} = 16 + (\text{frame distance from the previous I frame} \% 7) \text{ bits}$$

Figure 3:
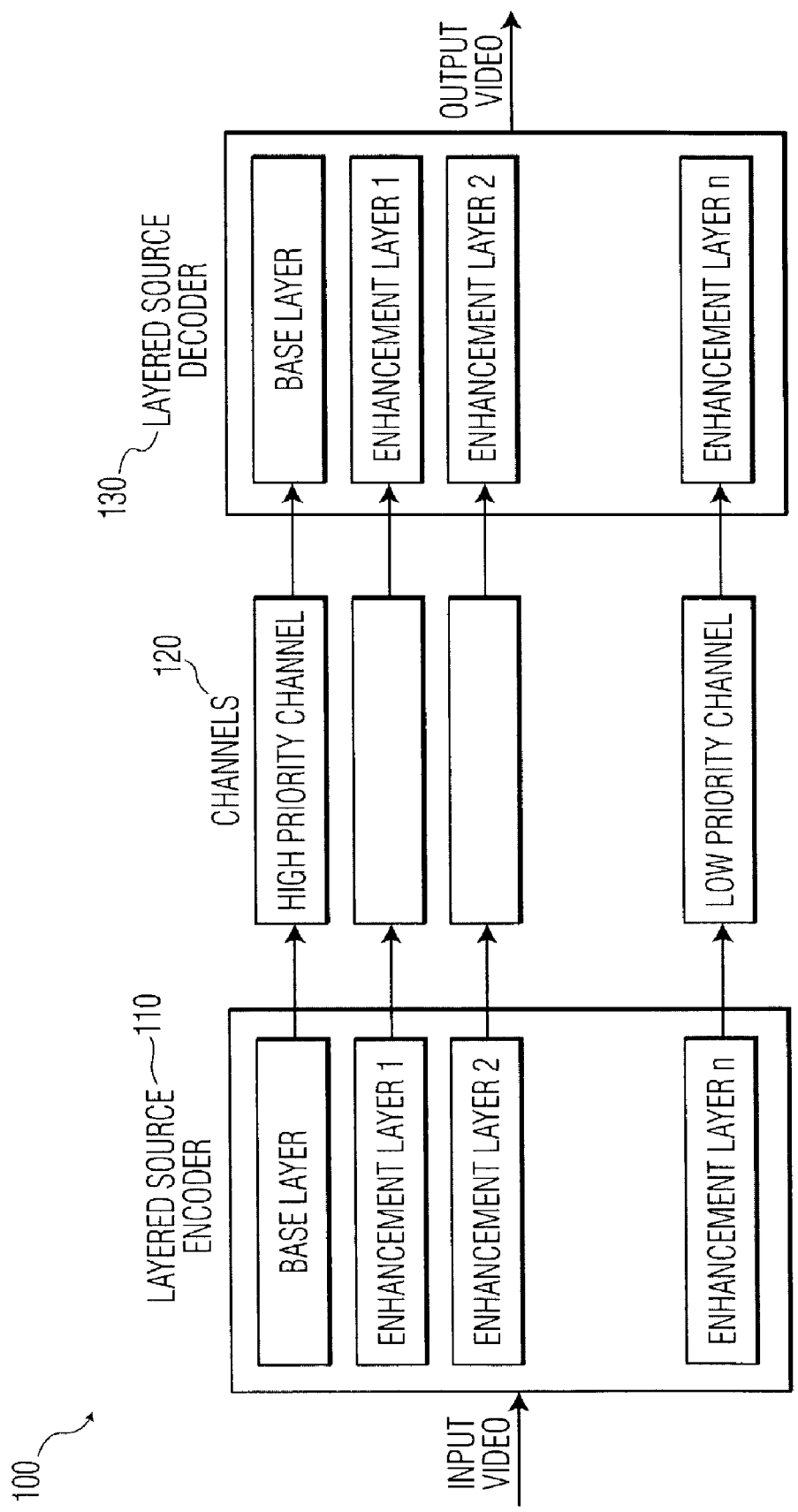
FIG. 3 depicts a video coding system in accordance with one aspect of the present invention.

In the above formula, the frame distance form the last I (intra-coded) frame can be easily computed by comparing the number of frames between the last I frame and the current frame assuming that no two I frame follow consecutively. The above formula guarantees that the resultant length of the RESYNC marker is between 16-23 bits and also guarantees the maximum separation between VOPs. However, if the length restriction for the RESYNC marker size is not imposed, different constant values for the above formula can be allowed. FIG. 3 illustrates a video system 100 with layered coding and transport prioritization. A layered source encoder 110 encodes input video data. A plurality of channels 120 carries the encoded data. A layered source decoder 130 decodes the encoded data.

There are different ways of implementing layered coding. For example, in temporal domain layered coding, the base layer contains a bit stream with a lower frame rate and the enhancement layers contain incremental information to obtain an output with higher frame rates. In spatial domain layered coding, the base layer codes the sub-sampled version of the original video sequence and the enhancement layers contain additional information for obtaining higher spatial resolution at the decoder.

Generally, a different layer uses a different data stream and has distinctly different tolerances to channel errors. To combat channel errors, layered coding is usually combined with transport prioritization so that the base layer is delivered with a higher degree of error protection. If the base layer is lost, the data contained in the enhancement layers may be useless.

Figure 4:
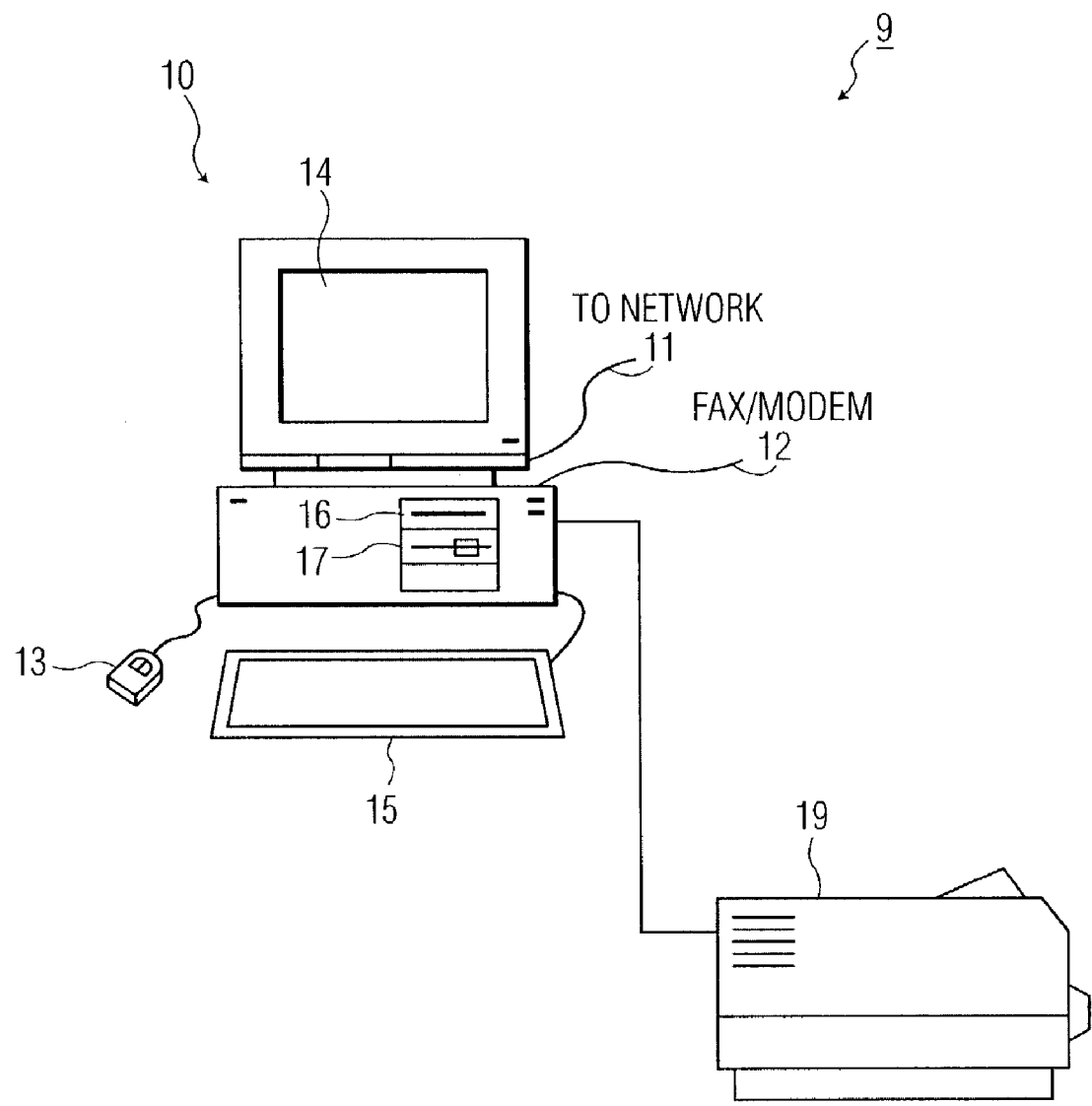
FIG. 4 depicts a computer system on which the present invention may be implemented.

FIG. 4 shows a representative embodiment of a computer system 9 on which the present invention may be implemented. As shown in FIG. 4, personal computer ("PC") 10 includes network connection 11 for interfacing to a network, such as a variable-bandwidth network or the Internet, and fax/modem connection 12 for interfacing with other remote sources such as a video camera (not shown). PC 10 also includes display screen 14 for displaying information (including video data) to a user, keyboard 15 for inputting text and user commands, mouse 13 for positioning a cursor on display screen 14 and for inputting user commands, disk drive 16 for reading from and writing to floppy disks installed therein, and CD-ROM drive 17 for accessing information stored on CD-ROM. PC 10 may also have one or more peripheral devices attached thereto, such as a scanner (not shown) for inputting document text images, graphics images, or the like, and printer 19 for outputting images, text, or the like.

Figure 5:
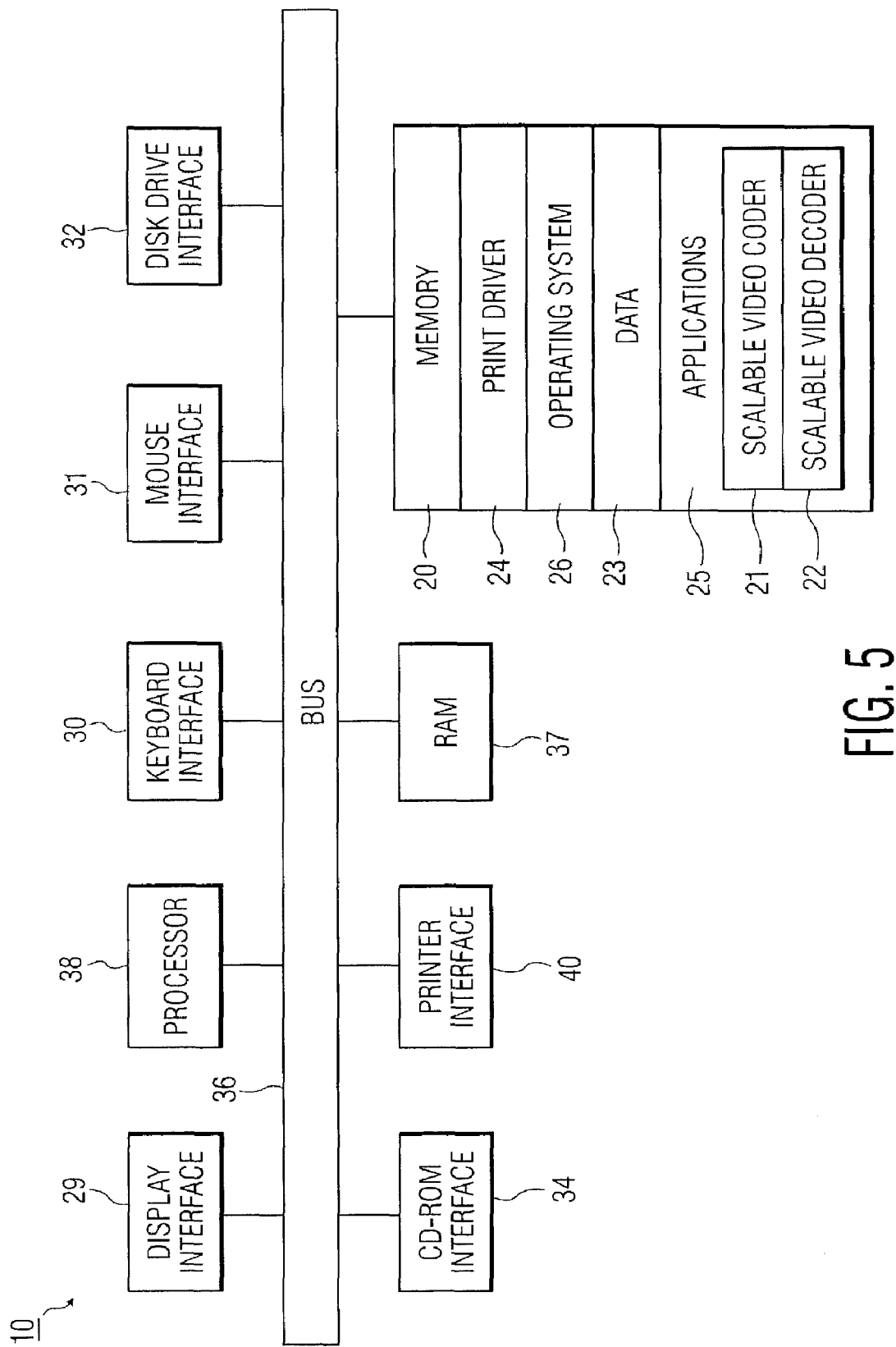
FIG. 5 depicts the architecture of a personal computer in the computer system shown in FIG. 4.

FIG. 5 shows the internal structure of PC 10. As shown in FIG. 7, PC 10 includes memory 20, which comprises a computer-readable medium such as a computer hard disk. Memory 20 stores data 23, applications 25, print driver 24, and operating system 26. In preferred embodiments of the invention, operating system 26 is a windowing operating system, such as Microsoft Windows95; although the invention may be used with other operating systems as well. Among the applications stored in memory 20 are scalable video coder 21 and scalable video decoder 22. Scalable video coder 21 performs scalable video data encoding in the manner set forth in detail below, and scalable video decoder 22 decodes video data which has been coded in the manner prescribed by scalable video coder 21. The operation of these applications is described in detail below.

Also included in PC 10 are display interface 29, keyboard interface 30, mouse interface 31, disk drive interface 32, CD-ROM drive interface 34, computer bus 36, RAM 37, processor 38, and printer interface 40. Processor 38 preferably comprises a microprocessor or the like for executing applications, such those noted above, out of RAM 37. Such applications, including scalable video coder 21 and scalable video decoder 22, may be stored in memory 20 (as noted above) or, alternatively, on a floppy disk in disk drive 16 or a CD-ROM in CD-ROM drive 17. Processor 38 accesses applications (or other data) stored on a floppy disk via disk drive interface 32 and accesses applications (or other data) stored on a CD-ROM via CD-ROM drive interface 34.

Application execution and other tasks of PC 4 may be initiated using keyboard 15 or mouse 13, commands from which are transmitted to processor 38 via keyboard interface 30 and mouse interface 31, respectively. Output results from applications running on PC 10 may be processed by display interface 29 and then displayed to a user on display 14 or, alternatively, output via network connection 11. For example, input video data that has been coded by scalable video coder 21 is typically output via network connection 11. On the other hand, coded video data which has been received from, e.g., a variable bandwidth-network is decoded by scalable video decoder 22 and then displayed on display 14. To this end, display interface 29 preferably comprises a display processor for forming video images based on decoded video data provided by processor 38 over computer bus 36, and for outputting those images to display 14. Output results from other applications, such as word processing programs, running on PC 10 may be provided to printer 19 via printer interface 40. Processor 38 executes print driver 24 so as to perform appropriate formatting of such print jobs prior to their transmission to printer 19.

Figure 6:
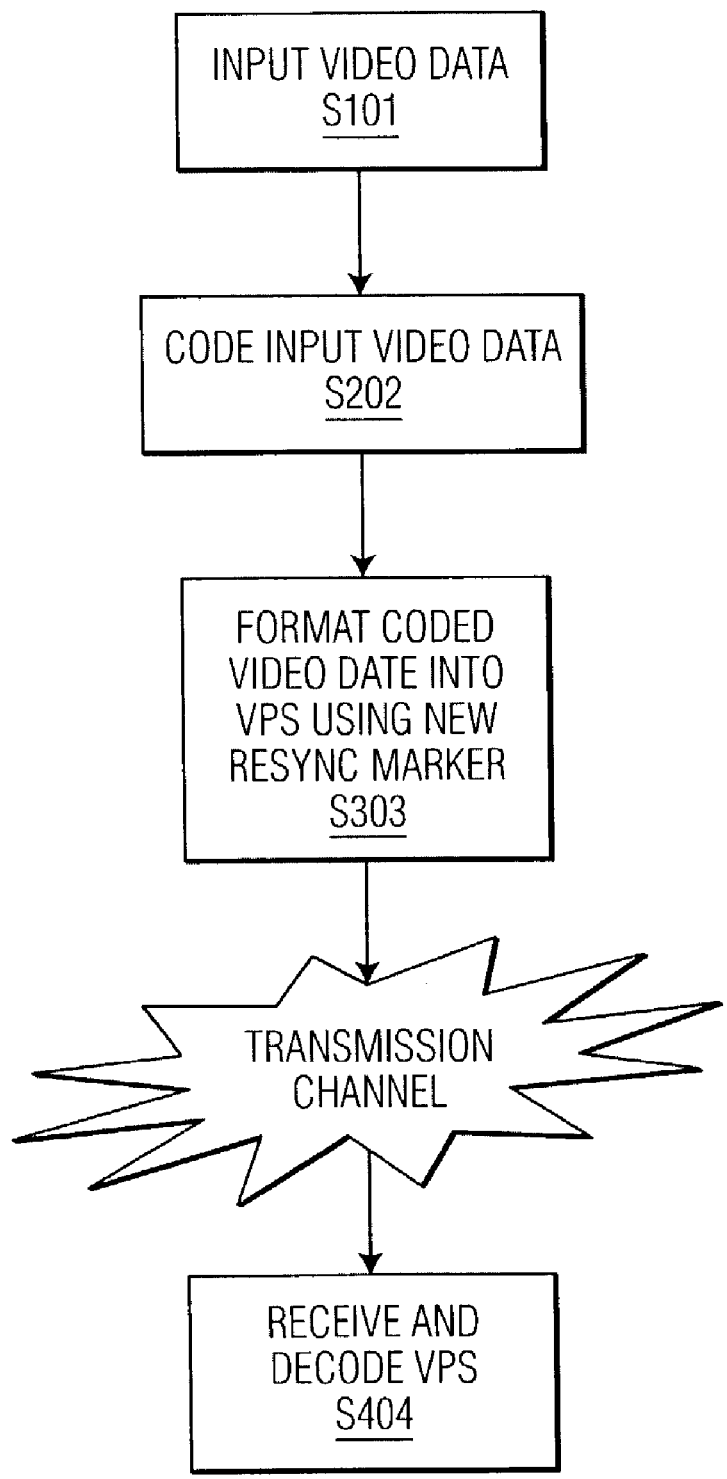
FIG. 6 is a flow diagram describing one embodiment of the present invention.

FIG. 6 is a flow diagram that explains the functionality of the video system 100 shown in FIG. 3. To begin, in step S101 original uncoded video data is input into the video system 100. This video data may be input via network connection 11, fax/modem connection 12, or via a video source. For the purposes of the present invention, the video source can comprise any type of video capturing device, an example of which is a digital video camera.

Next, step S202 codes the original video data using a standard technique. Step S202 may be performed by the layered source encoder 111. In preferred embodiments of the invention, the layered source encoder 111 is an MPEG-4 encoder. In step S303, a unique RESYNC marker is determined in accordance with the formulas discussed above. This RESYNCE marker is used during the code step S202. The resulting VP has a general structure as shown FIG. 1.

The VPs are received by a decoder, e.g., the layered source decoder 130, and decoded in step S404. Using the new RESYNC marker of the present invention provides for a more error tolerate decoding process.

Although the embodiments of the invention described herein are preferably implemented as computer code, all or some of the step shown in FIG. 6 can be implemented using discrete hardware elements and/or logic circuits. Also, while the encoding and decoding/techniques of the present invention have been described in a PC environment, these techniques can be used in any type of video devices including, but not limited to, digital televisions/set top boxes, video conferencing equipment, and the like.

In this regard, the present invention has been described with respect to particular illustrative embodiments. It is to be understood that the invention is not limited to the above-described embodiments and modifications thereto, and that various changes and modifications may be made by those of ordinary skill in the art without departing from the spirit and scope of the appended claims.

What is claimed is:

1. A coded video packet structure, comprising:
   a resynchronization marker that indicates a start of the coded video packet structure;
   predicted coding information; and
   motion/texture information that includes DC DCT coefficients and AC DCT coefficients, wherein the resynchronization marker can be represented by a binary number having a calculated number of zeros followed by a one, the number of zeros being determined by adding a constant value to a Video Object Plane sequence number modulo divided by a predetermined number.

2. The video packet structure according to claim 1 wherein the coded video packet structure is used for MPEG-4 coding.

3. A coded video packet structure, comprising:
a resynchronization marker that indicates a start of the coded video packet structure;
predicted coding information; and
motion/texture information that includes DC DCT coefficients and AC DCT coefficients,
wherein the resynchronization marker can be represented by a binary number having a calculated number or zeros followed by a one, the number of zeros being determined by adding a constant value to a Video Object Plane sequence number modulo divided by a predetermined number, wherein the coded video packet structure is used for MPEG-4 coding and the predetermined number is seven and the contact value is sixteen so that the number of zeros for the resynchronization marker is between 16 and 23.

4. A coded video packet structure, comprising:
a resynchronization marker that indicates a start of the coded video packet structure;
predicted coding information; and
motion/texture information that includes DC DCT coefficients and AC DCT coefficients,
wherein the resynchronization marker can be represented by a binary number having a calculated number of zeros followed by a one, the number of zeros being determined by adding a constant value to a Video Object Plane sequence number modulo divided by a predetermined number, wherein the predetermined number and the constant value are selected to ensure maximum separation between two video packets.

5. A coded video packet structure, comprising:
a resynchronization marker that indicates a start of the coded video packet structure;
predicted coding information; and
motion/texture information that includes DC DCT coefficients and AC DCT coefficients,
wherein the resynchronization marker can be represented by a binary number having a calculated number of zeros followed by a one, the number of zeros being determined by adding a constant value to a frame distance from a previous I-frame modulo divided by a predetermined number.

6. The video packet structure according to claim 5 wherein the coded video packet structure is used for MPEG-4 coding.

7. A coded video packet structure, comprising:
a resynchronization marker that indicates a start of the coded video packet structure;
predicted coding information; and
motion/texture information that includes DC DCT coefficients and AC DCT coefficients,
wherein the resynchronization marker can be represented by a binary number having a calculated number of zeros followed by a one, the number of zeros being determined by adding a constant value to a frame distance from a previous I-frame modulo divided by a predetermined number, wherein the coded video packet structure is used for MPEG-4 coding and the predetermined number is seven and the constant value is sixteen so that the number of zeros for the resynchronization marker is between 16 and 23.

8. A coded video packet structure, comprising:
a resynchronization marker that indicates a start of the coded video packet structure;
predicted coding information; and
motion/texture information that includes DC DCT coefficients and AC DCT coefficients,
wherein the resynchronization marker can be represented by a binary number having a calculated number of zeros followed by a one, the number of zeros being determined by adding a constant value to a frame distance from a previous I-frame modulo divided by a predetermined number, wherein the constant value and the predetermined value are selected to ensure maximum separation between two video packets.

9. A method of encoding video data comprising the steps of:
receiving input video data;
encoding the input video data in accordance with a predetermined coding process; and
formatting the encoded input video data into a video packet, the coded video packet including a start marker, at least one subsection including predicted coding information, and a encoded data section,
wherein the start marker can be represented by a binary number having a calculated number of zeros followed by a one, the number of zeros being determined by adding a constant value to a value determined during the encoding step modulo divided by a predetermined number.

10. The method according to claim 9 wherein the value determined during the encoding step is a video object plane sequence number.

11. The method according to claim 9 wherein the value determined during the encoding step is a frame distance from a previous I frame.

12. The method according to claim 9 wherein the predetermined coding process is an MPEG-4 coding process.

13. A method of encoding video data comprising the steps of:
receiving input video data;
encoding the input video data in accordance with a predetermined coding process; and
formatting the encoded input video data into a video packet, the coded video packet including a start marker, at least one subsection including predicted coding information, and a encoded data section,
wherein the start marker can be represented by a binary number having a calculated number of zeros followed by a one, the number of zeros being determined by adding a constant value to a value determined during the encoding step modulo divided by a predetermined number, wherein the predetermined number is seven and the constant value is sixteen so that the number of zeros of the start marker is between 16 and 23.

14. A method of encoding video data comprising the steps of:
receiving input video data;
encoding the input video data in accordance with a predetermined coding process; and
formatting the encoded input video data into a video packet, the coded video packet including a start marker, at least one subsection including predicted coding information, and a encoded data section, wherein the start marker can be represented by a binary number having a calculated number of zeros followed by a one, the number of zeros being determined by adding a constant value to a value determined during the encoding step modulo divided by a predetermined number, wherein the constant value and the predetermined number are selected to ensure maximum separation between two video packets.

15. An apparatus for decoding a plurality of encoded video packets forming two or more video object planes, the apparatus comprising:
- a memory which stores computer-executable process steps; and
- a processor which executes the process steps stored in the memory so as (i) to receive the plurality of encoded video packets, (ii) to search for a start marker in each of the plurality of encoded video packets, and (iii) to determine based upon the start marker a boundary between two of the video object planes.

16. The apparatus according to claim 15 wherein the encoded video packets are encoded using an MPEG coding process.

17. A coded video packet structure, comprising:
- a resynchronization marker that indicates a start of the coded video packet structure;
- predicted coding information; and
- motion/texture information that includes DC DCT coefficients and AC DCT coefficients,
- wherein the resynchronization marker can be represented by a binary number having a calculated number of zeros followed by a one, the number of zeros being determined by a formula, wherein the resultant length of the resynchronization marker is between a predetermined number of bits and provides a predetermined separation between Video Object Planes.

18. The video packet structure according to claim 17, wherein the predetermined number of bits is 16-23.

19. The video packet structure according to claim 17, wherein the predetermined separation between Video Object Planes is a maximum separation between Video Object Planes.

* * * * *